(12) United States Patent
Papadopoullos et al.

(10) Patent No.: US 10,402,745 B2
(45) Date of Patent: Sep. 3, 2019

(54) METHOD AND SYSTEM FOR ANALYSING SENTIMENTS

(71) Applicants: Alkis Papadopoullos, Outremont (CA); Jocelyn Desbiens, Saint-Lambert (CA)

(72) Inventors: Alkis Papadopoullos, Outremont (CA); Jocelyn Desbiens, Saint-Lambert (CA)

(73) Assignee: SEMEON ANALYTICS INC., Montreal (CA)

( * ) Notice: Subject to any disclaimer, the term of this patent is extended or adjusted under 35 U.S.C. 154(b) by 909 days.

(21) Appl. No.: 14/432,436

(22) PCT Filed: Sep. 30, 2013

(86) PCT No.: PCT/CA2013/000827
§ 371 (c)(1),
(2) Date: Mar. 30, 2015

(87) PCT Pub. No.: WO2014/047725
PCT Pub. Date: Apr. 3, 2014

(65) Prior Publication Data
US 2015/0286953 A1    Oct. 8, 2015

Related U.S. Application Data

(60) Provisional application No. 61/707,718, filed on Sep. 28, 2012.

(51) Int. Cl.
*G06N 20/00* (2019.01)
*G06F 17/27* (2006.01)
*G06N 7/02* (2006.01)
*G06N 5/02* (2006.01)

(52) U.S. Cl.
CPC ......... *G06N 20/00* (2019.01); *G06F 17/2785* (2013.01); *G06N 5/022* (2013.01); *G06N 7/023* (2013.01)

(58) Field of Classification Search
None
See application file for complete search history.

(56) References Cited

U.S. PATENT DOCUMENTS

| 6,611,825 B1 * | 8/2003 | Billheimer ........ G06F 17/30616 |
| | | 382/156 |
| 7,298,906 B2 * | 11/2007 | Duan ..................... G06K 9/623 |
| | | 382/173 |
| 2010/0023311 A1 * | 1/2010 | Subrahmanian ...... G06F 17/275 |
| | | 704/2 |

(Continued)

*Primary Examiner* — Alan Chen
(74) *Attorney, Agent, or Firm* — Brouillette Legal Inc.; Robert Brouillette (57) ABSTRACT

The present system and method for analyzing sentiment is based on fuzzy set theory and clustering to classify text as positive, negative, or objective. The method for training and testing a document collection to analyze sentiment comprises computing a frequency matrix comprising at least one row and at least one column vectors, executing term reduction of the terms, enumerating categories, computing centroids of the enumerated categories and computing a fuzzy polarity map. The row vectors may correspond to terms and the column vectors may correspond to documents. The frequencies of terms in a document indicate the relevance of the document to a query.

16 Claims, 4 Drawing Sheets

(56) References Cited

U.S. PATENT DOCUMENTS

| | | | |
|---|---|---|---|
| 2010/0262454 A1* | 10/2010 | Sommer | G06F 17/3071 706/20 |
| 2011/0078167 A1* | 3/2011 | Sundaresan | G06F 17/2785 707/765 |
| 2011/0112825 A1* | 5/2011 | Bellegarda | G06F 17/2785 704/9 |
| 2013/0103667 A1* | 4/2013 | Minh | G06F 17/30864 707/709 |
| 2014/0075004 A1* | 3/2014 | Van Dusen | H04L 41/04 709/223 |

* cited by examiner

METHOD AND SYSTEM FOR ANALYSING SENTIMENTS

CROSS-REFERENCE TO RELATED APPLICATIONS

The present patent application claims the benefits of priority of U.S. Provisional Patent Application No. 61/707,718, entitled "Method and system for analyzing sentiment" and filed at the United States Patents and Trademark Office on Sep. 28, 2012, the content of which is incorporated herein by reference.

FIELD OF THE INVENTION

The present invention generally relates to the identification of sentiment through informal, opinionated texts such as blog posts and product review websites

BACKGROUND OF THE INVENTION

Because of the complexity of the problem (underlying concepts, expressions in text, etc.), Sentiment Analysis encompasses several separate tasks. These are usually combined to produce some knowledge about the opinions found in text.

The first task is sentiment or opinion detection, which may be viewed as classification of text as objective or subjective. Usually opinion detection is based on the examination of adjectives in sentences. For example, the polarity of the expression "this is a beautiful picture" can be determined easily by looking at the adjective. An early study [HW00] examines the effects of adjectives in sentence subjectivity. More recent studies [BCP+07] have shown that adverbs may be used for similar purpose.

The second task is that of polarity classification. Given an opinionated piece of text, the goal is to classify the opinion as falling under one of two opposing sentiment polarities, or locate its position on the continuum between these two polarities. When viewed as a binary feature, polarity classification is the binary classification task of labeling an opinionated document as expressing either an overall positive or an overall negative opinion.

SUMMARY OF THE INVENTION

The present invention generally concerns a novel polarity/subjectivity predictor for written text based on clustering, fuzzy set theory, and probability distribution moments. It relies on Lucene indexing capacities to index and cluster both training and testing document collections and on fuzzy set theory to compute grade membership of terms in various pre-defined or computed categories. Polarity/Subjectivity detection is the last step of the whole process. The main features of the present invention comprise outstanding performances on various test corpora, both English and French, linear complexity proportional to the length of input text, supervised and unsupervised training modes, best accuracy obtained when testing done in conjunction with training, testing can be done over any training set, testing can be done without training set, highly configurable.

The present invention further concerns a a method for training a document collection to analyze sentiment comprising the steps to compute a frequency matrix comprising at least one row and at least column vectors, to execute term reduction of the terms, to enumerate categories, to compute centroids of the enumerated categories and to compute fuzzy polarity map. The at least one row vector of the matrix may correspond to terms and the at least one column vector may correspond to documents. Furthermore, the frequencies of terms in a document tend to indicate the relevance of the document to a query and every term of the frequency matrix is conceived as a separate dimension of a vector space and wherein a document is a formal vector.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

Novel method and system for identifying sentiments will be described hereinafter. Although the invention is described in terms of specific illustrative embodiment(s), it is to be understood that the embodiment(s) described herein are by way of example only and that the scope of the invention is not intended to be limited thereby.

The present invention relates to a method and system for analyzing sentiment in written text, such as documents, user posts content and other online document. The system and method is a polarity and/or subjectivity predictor for written text based on clustering, fuzzy set theory, and probability distribution moments.

The system is a polarity/subjectivity predictor for written text based on
  clustering,
  fuzzy set theory, and
  probability distribution theory.

In a preferred embodiment, the system uses Lucene as the indexer capacities to index and cluster both training and testing document collections and on fuzzy set theory to compute grade membership of terms in various pre-defined or computed categories. Polarity/Subjectivity detection is the last step of the whole process.

Main features of the system comprise:
- outstanding performances on various test corpora: English, French, and Spanish,
- linear complexity proportional to the length of input text,
- supervised and unsupervised training modes,
- best accuracy obtained when testing done in conjunction with training,
- testing can be done over any training set,
- testing can be done without training set2,
- highly configurable.

The system for analyzing sentiment comprises an indexer, such as Lucene indexing capabilities. The indexer indexes and clusters both training and testing document collections. The system further relies on fuzzy set theory to compute grade membership of terms in various pre-defined or computed categories. The polarity/subjectivity detection is the last step of the process.

Figure 1:
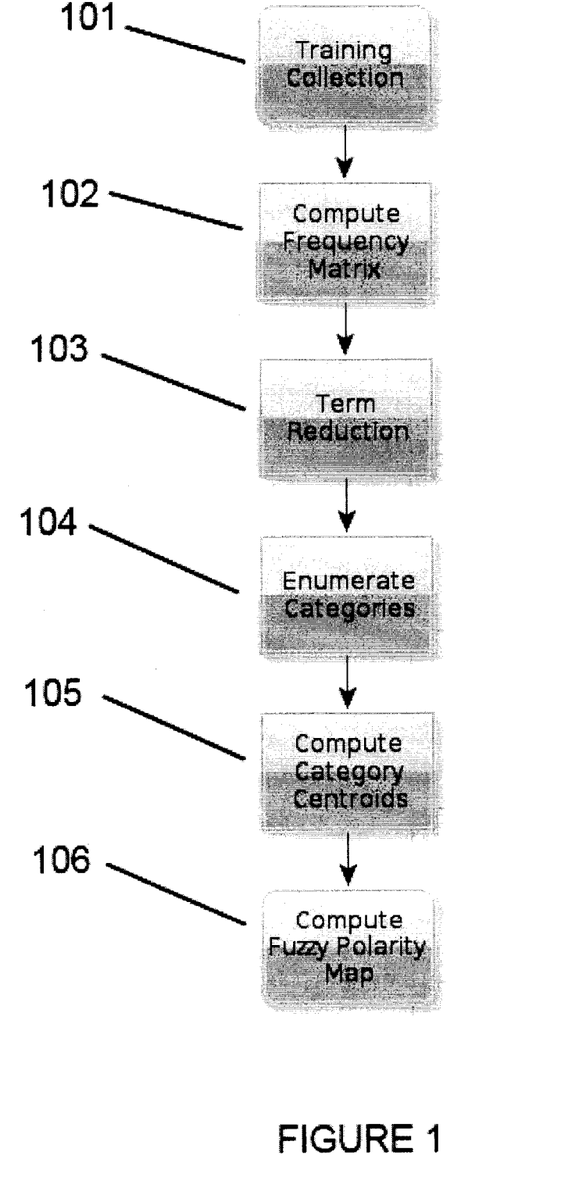
FIG. 1 is a workflow diagram of a method for training a document collection to analyze sentiment in accordance with the principles of the present invention.

Now referring to FIG. 1, the method for training a document collection to analyze sentiment 101 comprises the steps to compute the frequency matrix 102, to execute term reduction 103, to enumerate categories 104, to compute category centroids 105 and to compute fuzzy polarity map 105.

As large collections of documents may be analyzed to train the system, it is convenient to compute the frequency matrix 102. The row vectors of the matrix correspond to terms, such as words or sentences, and the column vectors correspond to documents. This kind of matrix is typically called a term-document matrix.

In a term-document matrix, a document vector represents the corresponding document as a bag of terms, such as words or sentences. The relevance of documents to a query may be estimated by representing the documents and the query as bags of terms. That is, the frequencies of terms in a document tend to indicate the relevance of the document to a query.

As an example, one may suppose that the training document collection D contains n documents and m unique terms and let T be the term-document matrix:

$$\mathcal{T} = \begin{pmatrix} f_{11} & \cdots & f_{1n} \\ \vdots & \ddots & \vdots \\ f_{m1} & \cdots & f_{mn} \end{pmatrix}$$

In this example, the matrix T comprises m rows, typically one row for each unique term in the vocabulary, and n columns, typically one column for each document. Let $\omega_i$ be the i-th term in the vocabulary and let $d_j$ be the j-th document in the collection. The i-th row in T is the row vector $f_{i\cdot}$ and the j-th column in T is the column vector $f_{\cdot j}$. The row vector $f_{i\cdot}$ contains n elements, such as one element for each document, and the column vector $f_{\cdot j}$ contains m elements, such as one element for each term.

The element $f_{ij}$ in T represents the frequency of the i-th term $w_i \in W$ in the j-th document $d_j$. In general, the value of most of the elements in T will be zero as the matrix is sparse since most documents will use only a small fraction of the whole vocabulary.

Figure 2A:
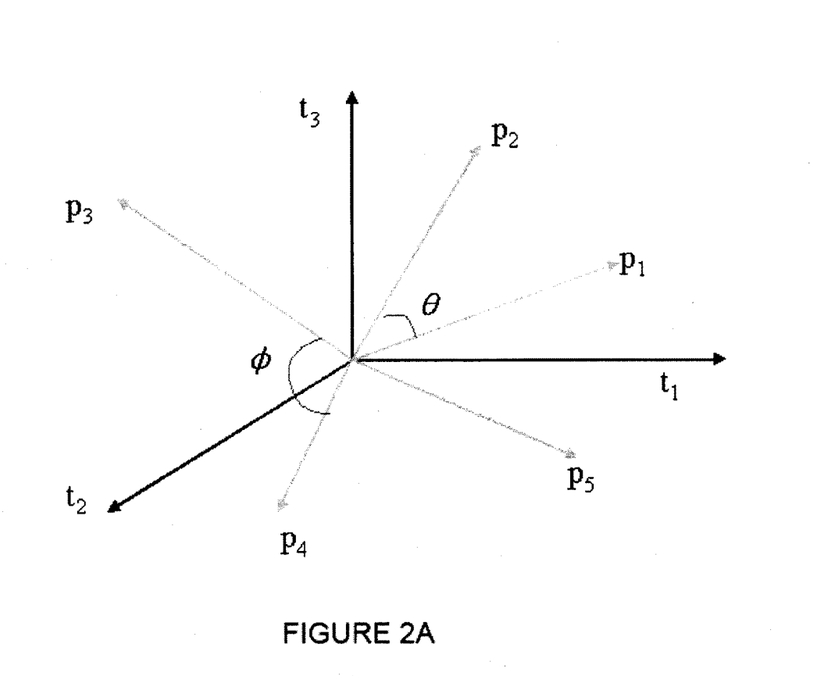
FIG. 2A is a diagram of a vector space model where every term is conceived as a separate dimension, each axis, of a vector space, in which every document and query can be seen as a formal rather than physical vector in accordance with the principles of the present invention.

Thus, now referring to FIG. 2a, the Vector Space Model is shown. In this model, every term is conceived as a separate dimension, each axis, of a vector space, in which every document and query can be seen as a formal rather than physical vector, typically weighted vector. Retrieval is based on different similarity measures used as retrieval functions derived from the dot product (as a measure of count of terms in common) between the query and document vectors.

Figure 2B:
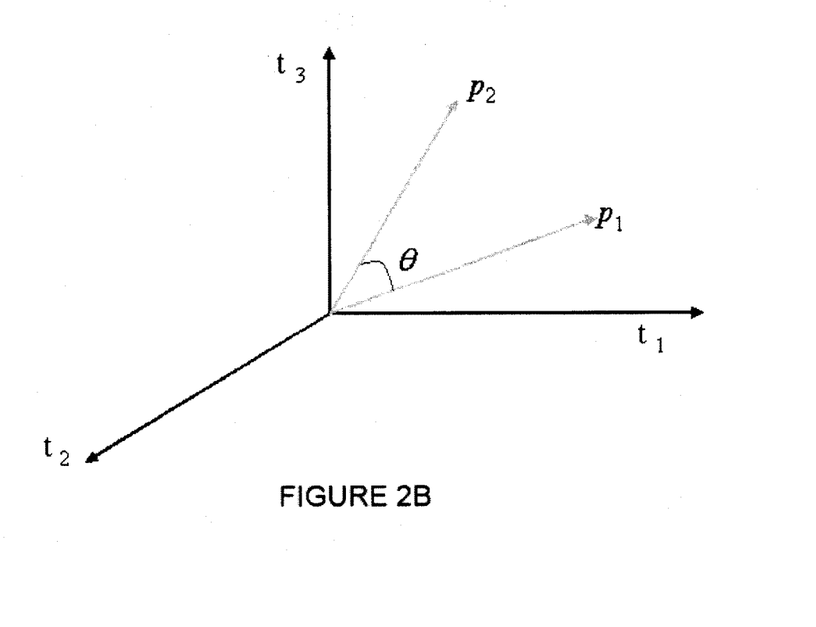
FIG. 2B is a diagram of representing the distance between vectors measured by the cosine function in accordance with the principles of the present invention.

Now referring to FIG. 2b, the distance between vectors may be measured by various geometrically-motivated functions, such as, but not limited to the $L_1$ and $L_2$ norms and the cosine function. One skilled in the art will understand that all three of these functions are common and that any other information retrieval function or method may be used.

The inner product is a natural measure of similarity. As an example, taking any two documents u and v in V, let $0 \leq \theta(u,v) \leq \pi/2$ denote the angle between them; then $$<u,v> = \|u\|\|v\|\cos(\theta(u,v)) = \cos(\theta(u,v)).$$

One may notice that the cosine is an inverse distance function, in that it achieves its maximum of 1 when u=v, and is zero when the supports of u and v are disjoint. Hence, the inner product (u,v) is often known as the cosine similarity. Since cosine similarity is easy to interpret and simple to compute for sparse vectors, such function is used in a preferred embodiment However, one skilled in the art shall understand that other functions may be used to compute the distance function, such as the Hamming distance computation (applying to strings of same length), the longest common subsequence metric, the Damereau-Levenshtein distance, etc.

In the present system and method for analysing sentiment, the term-document matrix is computed by an indexer and clustered engine such as Lucene. Such engine typically offers various statistics such as frequency and tf-idf. Furthermore, the matrix is normalized in order to deal with unit vectors.

The step to execute term reduction 103 comprises an initial step to one or more linguistic pre-treatments. The first linguistic pre-treatment is based on the extraction of all linguistic units (lemmatised words or lemmas) used for document representation. Another linguistic pre-treatment is to eliminate terms having grammar categories with low discriminative power with regard to opinion mining, such as undefined articles and punctuation marks. During this step, the lemmas associated with almost all grammatical categories, such as adverbs, are kept or stored in order to specifically process opinion documents. Each kind of word may contain opinion discriminative information, even if such discriminative information is very slight.

In a preferred embodiment, the step to apply several linguistic pre-treatments are done through a handful of chained filters such as Lucene built-in filters:
- standardFilter which removes apostrophes and removes dots in acronyms,
- lowerCaseFilter which changes all characters to lowercase,
- stopFilter which eliminates some commonly used words. Words very common in a language (like a, the, and is in English) are usually not relevant to the search and dilute the results. They are sometimes called noise words and are usually filtered out. By default, StopFilter will remove commonly used English words,
- numericTokenFilter which eliminates numeric values, and lengthFilter which removes words which are too long and too short from the stream.

In another embodiment, other linguistic pre-treatments may be used and the order of such pre-treatments may be adapted to the type of terms or documents analyzed.

The step to enumerate categories may comprise the supervised or unsupervised training.

In order to enumerate categories in a supervised training environment, one or more training collections is divided in p categories $Cat_j$, for j=1, ..., p, based on the sentiment type analysis to be executed. In a preferred embodiment, a polarity detection requires three categories: Cat1=positive, Cat2=negative and Cat3=objective, while subjectivity detection requires the following categories: Cat1=subjective, Cat2=objective and Cat3=other.

In another embodiment, the classifier may not be limited to three categories as the document collections may contain any number of categories as long as the following constraint is respected $$Cat_{training} \subseteq Cat_{testing}.$$

In other words, that the training categories must be subset of the testing ones.

If the training document collection is not pre-categorized, it is possible to clusterize the collection using an unsupervised clustering method, such the Spherical k-means method. The Spherical k-means is a method for clustering high-dimensional text data and is designed to handle $L_2$ unit norm vectors. The Spherical k-means is reminiscent of the quadratic k-means algorithm, however the distance between two unit vectors u and v is measured by $d(u, v)=u^T v$ (so that the two unit vectors u and v are equal if and only if $d(u, v)=1$).

One of the objectives of the unsupervised clustering is to maximize the regrouping of documents along their cluster centers, where a cluster center is defined as the mean or centroid of the documents in a cluster, as describe herein below.

The coherence is a measure of how well the centroids represent the members of their clusters. As an example, the scalar product of each vector from its centroid summed over all vectors in the cluster:

$$coherence_j := \sum_{p_i \in \pi_j} p_i^T c_j$$

where $p_i$ represents column i of matrix T. The quality of any given clustering $$\{\pi_j\}_{j=1}^p$$

may be measured by the following objective function ISim:

$$ISim(\{\pi_j\}_{j=1}^p) := \sum_{j=1}^p \sum_{p_i \in \pi_j} p_i^T c_j$$
$$= \sum_{j=1}^p coherence_j.$$

Intuitively, the objective function measures the combined coherence of all the p clusters. As described above, ISim is an objective function in k-means, thus one of the goals is to maximize its value. The k-means function comprises an initial step to select the seeds, such as the initial cluster centers randomly selected documents. The function then moves the cluster centers around in space in order to maximize the coherence-. In a preferred embodiment, the coherence is maximized by iteratively repeating two steps until a stopping criterion is met, the two steps being: reassigning documents to the cluster with the closest centroid; and recomputing each centroid based on the current members of its cluster.

Another object of the spherical k-means is to minimize intra-cluster variance knowing that the minimum is a local minimum and that the results depend on the initial choice of the seed documents.

The step to compute category centroids 105 may be realized as supervised training or as unsupervised training.

In a supervised training environment, a cluster $\pi_k$, i.e. the subset of documents in the collection belonging to the category, is assigned to each category $Cat_k$.

As a definition, for k=1, ..., p let $\pi_k = \{p_i \in Cat_k\}$. The centroid vector (or barycentre) of the cluster $\pi_j$ is $$c_j := \frac{1}{n_j} \sum_{p_i \in \pi_j} p_i.$$

The centroid vector $c_j$ comprises the following important property. For any positive vector z, we have from the Cauchy-Schwarz inequality that $$\sum_{p_i \in \pi_j} p_i^T z \leq \sum_{p_i \in \pi_j} p_i^T c_j.$$

Thus, the centroid vector may be thought of as the vector that is closest, in average, to all vectors in the cluster $\pi_j$.

Figure 3:
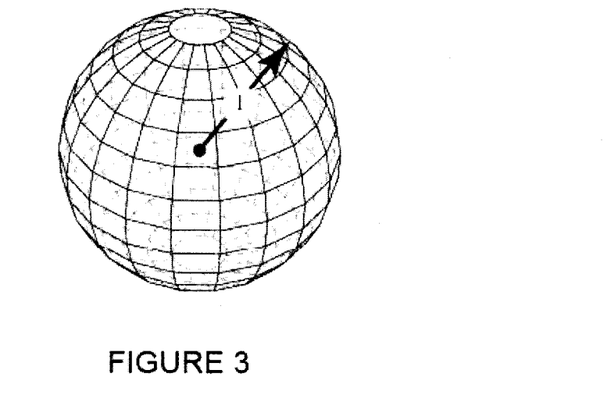
FIG. 3 is a diagram depicting the generated clusters used as an input to the spherical k-means algorithm in an unsupervised training environment in accordance with the principles of the present invention.

Now referring to FIG. 3, in an unsupervised training environment, the clusters generated are used as an input to the spherical k-means algorithm.

The result of the centroid computation 105 is an term-document matrix T reduced to the following matrix $$\mathcal{T}' = \begin{pmatrix} c_{11} & \cdots & c_{1p} \\ \vdots & \ddots & \vdots \\ c_{m1} & \cdots & c_{mp} \end{pmatrix} = (c_1 | \ldots | c_p).$$

Following the computation of category centroids 105, the method computes fuzzy polarity map 106. A fuzzy set is a pair (X, μ) where X is a set and μ:X→[0, 1]. For each x, μ(x) is called the grade of membership of x in (X, μ). For a finite set X={$x_1, \ldots, x_n$}, the fuzzy set (X, μ) is typically denoted by {μ($x_1$)/$x_1$, ..., μ($x_n$)/$x_n$}. Let x∈X then x is called not included in the fuzzy set (X, μ). If μ(x)=0, x is called fully included. If μ(x)=1. If if 0<μ(x)<1, x is called fuzzy member.

In the spirit of Zadeh's notation, the following definition and notation shall be understood.

Figure 4:
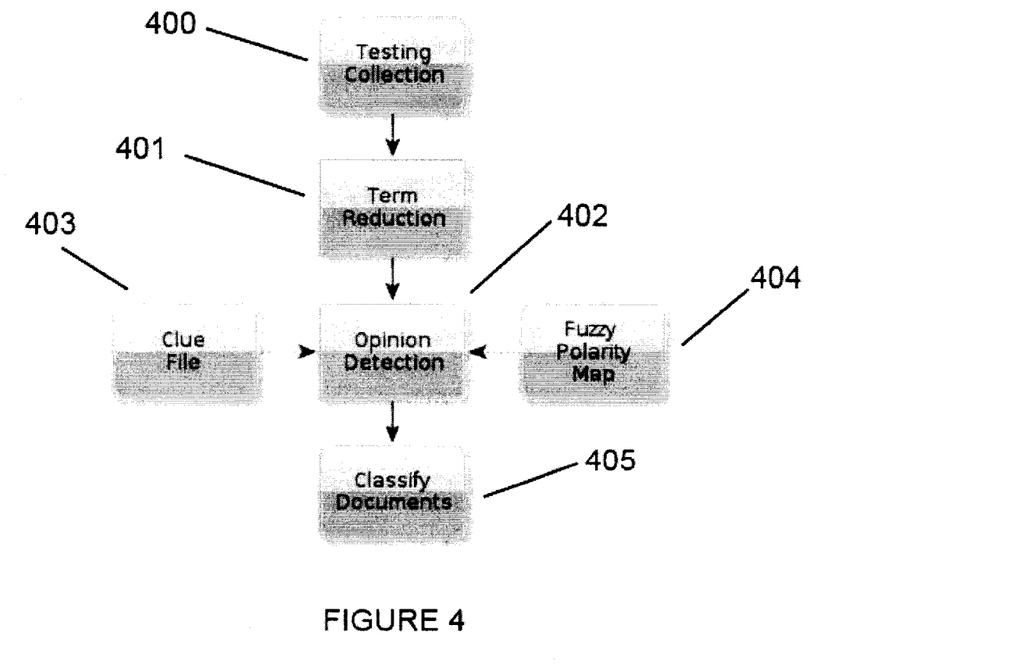
FIG. 4 is a workflow diagram of a method to test a trained document collection and to identify sentiment in accordance with the principles of the present invention.

The polarity map definition is the transformation $$(\forall \omega \in W)(\pi: \omega \mapsto (\mu(\omega)/c_0 | \ldots | \mu(\omega)/c_p)),$$

where μ(ω)/$c_j$ means the grade of membership of ω in category $c_j$,

Now referring to FIG. 4, a method to test a trained document collection and to identify sentiment 400 in accordance with the present invention is shown. The method to test the collection comprises the steps to compute the term reduction 401, to detect one or more opinion 402 based on the indexer result 403 and on the fuzzy polarity map 404 and to classify the documents 405.

The step to compute the term reduction 401 allows useless terms in frequency matrix to be removed. Typically, filters in the indexer are used to remove such useless terms, such as Lucene built-in filters. To narrow down the term spectrum, a POS-Tagger engine may be used to filter out all terms except those belonging to four potentially orientation containing grammatical categories: adjective (JJ), adverb (RB), noun (NN) and verb (VB).

In a preferred embodiment, the QTag runtime POS-tagger engine may be used. QTag is a freely available, language independent POSTagger. It is implemented in Java, and has been successfully tested on Mac OS X, Linux, and Windows. While the QTag engine may be implemented to be input with any language for which one or more resource files exists. One skilled in the art shall understand that any other POS-Tagger may be adapted to reduce the terms. As an example, the Stanford POS-Tagger may be used by explicitly setting the parameter posTagger to the value stanford.

Figure 5A:
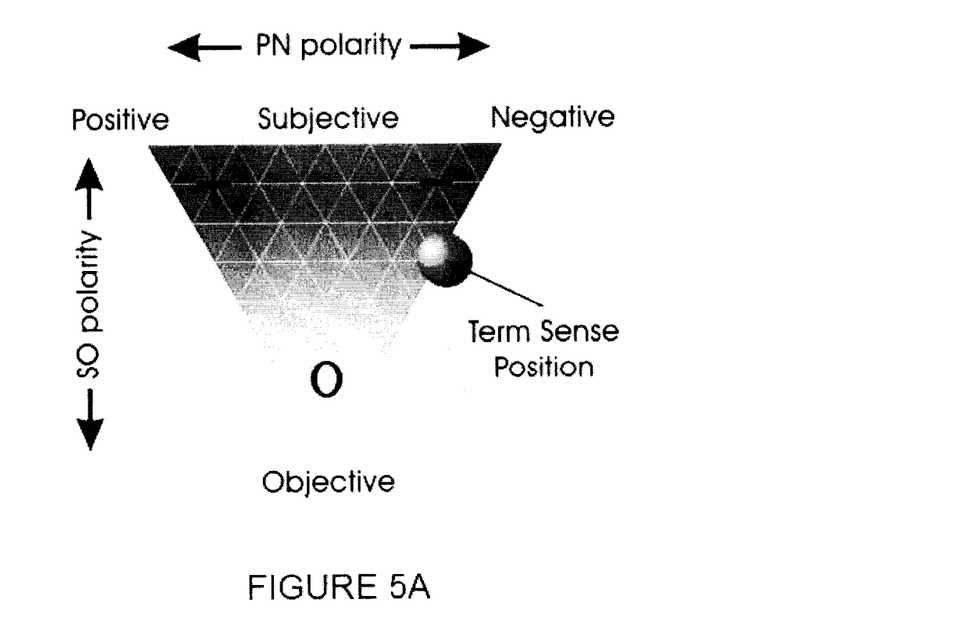
FIG. 5A is a diagram showing a way of displaying computed values in a polyhedral whose vertices are the maximum possible values for the p dimensions observed, more specifically, the diagram shows an embodiment for the graphical model having case p=3 (positive, negative, and objective).
Figure 5B:
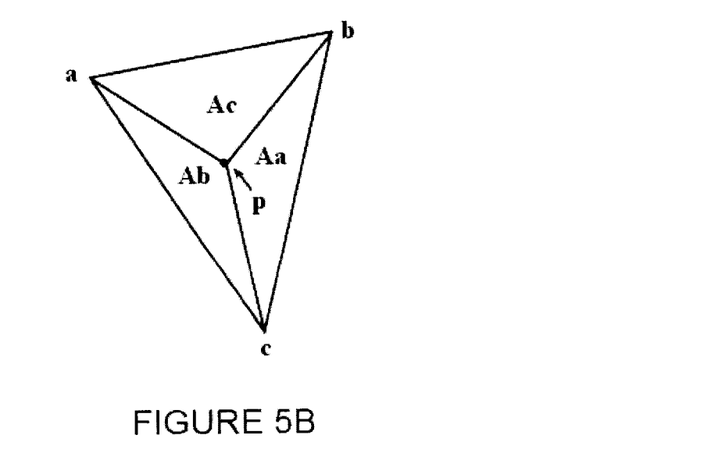
FIG. 5B is a diagram showing a way of displaying computed values in a a barycentric mapping in accordance with the principles of the present invention.

Now referring to FIGS. 5A and 5B, representation of the result of the detection of one or more opinion 402 are depicted. In the step 402, the term polarity from π Map is computed using the following definition.

Let $\omega \in W$ and $(\mu(\omega)/c_0| \ldots |\mu(\omega)/c_p)$ be the category-related grades assigned to w in the fuzzy polarity map π. As $$\sum_{j=1}^{p} \mu(w)/c_j = 1$$

As showed in FIG. 5A, it is possible to display the computed values in a polyhedral whose vertices are the maximum possible values for the p dimensions observed. The FIG. 5A shows the graphical model for the case p=3 (positive, negative, and objective).

Still referring to FIG. 5A, the edges of the triangle represent one of the three classifications (positive, negative, and objective). A term can be located in this space as a point, representing the extent to which it belongs to each of the classifications. In the same fashion, the polarity (Positive-Negative) and objectivity (Subjective-Objective) are also shown.

Now referring to FIG. 5B, a barycentric mapping is shown. The barycentric coordinates system is the best way to handle the multidimensional case. One should consider a triangle whose vertices are a, b, c (as shown in FIG. 5B) and a point p. Barycentric coordinates allow the coordinates of p to be expressed in terms of a, b, c.

The barycentric coordinates of the point p in terms of the points a, b, c are the numbers $\alpha$, $\beta$, $\gamma$ such that $$p = \alpha a + \beta b + \gamma c$$

with, the constraint $\alpha + \beta + \gamma = 1$.

As a definition, let $A_a$, $A_b$ and $A_c$ be as in $1_b$ and let A denotes the area of the triangle. Also note that the point inside the triangle is a point called p. It can be easily shown that $$\alpha = \frac{A_a}{A}, \beta = \frac{A_b}{A}, \text{ and } \gamma = \frac{A_c}{A}.$$

The most influential vertex (i.e., the vertex whose assigned triangle of FIG. 5B has the biggest volume) yields the following definition.

The first definition is the polarity of a term w and is determined by the polarity of the vertex v where $$v = \operatorname{argmax}\left\{A_j \left| \sum_{j=1}^{p} (\mu(w)/c_j) \times c_j \right.\right\}$$

with $\sum_{j}^{p} = 1 \mu(\omega)/c_j = 1$.

In the above example, the polarity of displayed term is negative.

Another definition is the polarity of a term w, which is given by its prior polarity field entry in the corresponding file.

The step may compute the text subjectivity and/or the text polarity. The text polarity may be obtained by following the three following steps:
- build the polarity histogram of all terms belonging to the input text,
- compute skewness of the histogram, which is the measure of the asymmetry of the probability distribution of a real-valued random variable,
- categorize text in terms of the computed skewness.

The text subjectivity may be obtained by executing the three following steps:
- build the polarity histogram of all terms belonging to the input text,
- compute kurtosis of the histogram,
- categorize text in terms of the computed kurtosis.

The performance of the method to analyse sentiment may be determined by calculating metrics relating to precision, recall, accuracy, and $F_1$, whose definitions follow:

$$\text{precision} = \sum_{j=1}^{p} \frac{TP_j}{TP_j + FP_j},$$

$$\text{recall} = \sum_{j=1}^{p} \frac{TP_j}{TP_j + FN_j},$$

$$\text{accuracy} = \sum_{j=1}^{p} \frac{TP_j + TN_j}{TP_j + TN_j + FP_j + FN_j},$$

$$F_1 = 2 \times \frac{\text{precision} \cdot \text{recall}}{\text{precision} + \text{recall}}$$

where $TP_j$, $TN_j$, $FP_j$, and $FN_j$ are the usual classification ratios assigned to a predictor for a category $Cat_j$.

While illustrative and presently preferred embodiment(s) of the invention have been described in detail hereinabove, it is to be understood that the inventive concepts may be otherwise variously embodied and employed and that the appended claims are intended to be construed to include such variations except insofar as limited by the prior art.

The invention claimed is:

1. A computer-implemented method for training a document collection to analyze sentiment comprising:
   a) receiving a text expression from a computerized device;

b) a processor computing a frequency matrix from the received text expression, the frequency matrix comprising at least one row and at least column vectors, each row representing at least one term in a vocabulary each column representing at least one document of the document collection;

c) the processor executing a term reduction of the terms to remove useless terms in the frequency matrix;

d) the processor enumerating a plurality of categories of the document collection, the categories comprising at least 3 sentiment classes and at least 8 gradations for each sentiment classes, the classes comprising positive, negative, and neutral sentiments;

e) the processor computing centroids of the enumerated categories; and f) the processor computing a fuzzy polarity map by:
   i) building a polarity histogram of all terms belonging to the inputted expression;
   ii) computing skewness of the polarity histogram;
   iii) categorizing the inputted expression in terms of the computed skewness.

2. A method for training a document collection to analyze sentiment as claimed in claim 1, wherein the gradations of positive class comprises at least very positive, positive, lightly positive, the gradations of negative class comprises at least very negative, negative, or lightly negative and the gradation of neutral comprises balanced and true neutral.

3. A method for training a document collection to analyze sentiment as claimed in claim 1, wherein the frequencies of terms in a document are relative frequencies based on document length normalization, weighted based on information theory metrics adapted to assign a frequency score to the term based on normalized tf/idf and a proxy for an information index.

4. A method for training a document collection to analyze sentiment as claimed in claim 2, wherein every term of the frequency matrix is conceived as a separate dimension of a vector space and wherein a document is a formal vector.

5. A method for training a document collection to analyze sentiment as claimed in claim 1, wherein the distance between the vectors is measured by a geometrically-motivated function.

6. A method for training a document collection to analyze sentiment as claimed in claim 5, wherein the geometrically motivated function is one of the following functions: $L_1$ norm, $L_2$ norm and cosine function.

7. A method for training a document collection to analyze sentiment as claimed in claim 1, wherein the step to execute term reduction comprises an initial step to apply one or more linguistic pre-treatments.

8. A method for training a document collection to analyze sentiment as claimed in claim 7, wherein the first linguistic pre-treatment is based on the extraction of all linguistic units used for document representation.

9. A method for training a document collection to analyze sentiment as claimed in claim 8, wherein the step to apply several linguistic pre-treatments is done through chained filters.

10. A method for training a document collection to analyze sentiment as claimed in claim 1, wherein the step to enumerate categories uses one or more training collections which are divided in a plurality of categories based on the sentiment type analysis to be executed.

11. A method for training a document collection to analyze sentiment as claimed in claim 10, wherein a polarity detection requires three categories: positive, negative and objective, and wherein a subjectivity detection requires the three other categories: subjective, objective and other.

12. A method for training a document collection to analyze sentiment as claimed in claim 10, wherein the step to compute category centroids assigns a cluster to each enumerated category.

13. A method for training a document collection to analyze sentiment as claimed in claim 1, wherein the step to enumerate categories uses an unsupervised clustering method.

14. A method for training a document collection to analyze sentiment as claimed in claim 13, wherein the unsupervised clustering method is the Spherical k-means method.

15. A method for training a document collection to analyze sentiment as claimed in claim 14, wherein clusters are generated and are used as an input to the Spherical k-means method.

16. A method for training a document collection to analyze sentiment as claimed in claim 1, further comprising computing text subjectivity of the inputted expression by:
   a) building the polarity histogram of all terms belonging to the inputted expression;
   b) computing kurtosis of the polarity histogram;
   c) categorizing inputted expression in terms of the computed kurtosis.

* * * * *